Patented Oct. 29, 1946

2,410,318

UNITED STATES PATENT OFFICE 2,410,318

PROCESS FOR THE PRODUCTION OF ACYLATED AMINO HYDROXY COMPOUNDS BY THE ACTION OF ACID ANHYDRIDES ON 2-OXAZOLINES

Philip F. Tryon, Terre Haute, Ind., assignor to Commercial Solvents Corporation, Terre Haute, Ind., a corporation of Maryland No Drawing. Application April 12, 1943, Serial No. 482,761

5 Claims. (Cl. 260—561)

This invention relates to a process for the production of O-acylated amides, and more particularly to the preparation of such compounds by the reaction of acid anhydrides with 2-oxazolines.

2-oxazolines of the type contemplated by my invention may be readily prepared by reacting an aliphatic acid with a suitable aminohydroxy compound, in approximately equimolecular proportions. Further reaction of such oxazoline compounds, as such, with acyl radicals is impossible as it is well known that the acyl group will not replace a hydrogen atom where it is attached to an alkyl group, but will only replace such atoms when it is bound to hydroxyl, amino, or similar groups.

I have now found that acylation of the 2-oxazolines descrbed can be accomplished with splitting of the oxazoline ring, resulting in the production of a series of straight chain O-acylated amides, instead of the acid salts, formed by the prior art procedures.

The reaction probably proceeds somewhat as follows:

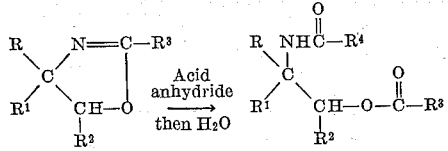

where R represents hydrogen, phenyl, acyloxyalkyl, or alkyl; $R^1$ represents alkyl or acyloxy-alkyl; $R^2$ is hydrogen; and $R^3$ and $R^4$ are alkyl.

The O-acylated amides which can be prepared according to my invention include all those embodied in the structural formula given above, among which the following may be specifically mentioned: tris (acetoxymethyl) acetamidomethane, 2-propionamido-2-phenylbutyl propionate, 2-acetamido-2-methyl-1,3-propanediol diacetate, 2-lauramido-2-methyl-1,3-propanediol dilaurate, 2-caproamido-2-methyl-1,3-propanediol diacetate, 2-lauramido-2-methylpropyl acetate, and 2-acetamidobutyl acetate.

In accordance with my invention, the 2-oxazoline compound is refluxed with a fatty acid anhydride for a short time, for example one-half hour, or less, at reflux temperature. Then water is added thereto and the mixture is thoroughly shaken whereupon crystals of the acylated aliphatic hydroxy amide separate out and may be removed therefrom by filtration and further purified by recrystallization from water, or an organic solvent. In appropriate cases, crystallization is favored by the salting-out effect obtained by the addition of common salt to the final mixture. With the products which are liquids, the final result is attained simply by treatment with water. The lower boiling products may be purified by high vacuum distillation. The higher boiling products are suitably purified simply by vacuum evaporation of low boiling impurities.

The mechanism of the reaction is not completely understood and it was very surprising and unexpected that ring-splitting by acylation occurred. It was believed that the 2-oxazoline ring was stable and immune to reactions of this type and that such reactions would not take place. However, the reaction does occur, as shown by the identity of the products obtained.

The oxazolines which I may utilize as starting materials may be any of those embodied in the structural formula given above, and particularly, 2-methyl-4,4-bis-(acetoxymethyl) - 2 - oxazoline, 2,4-dimethyl-4-acetoxymethyl-2 - oxazoline, 2-undecyl-4-methyl-2-oxazoline, 2-pentyl-4-methyl-2-oxazoline, 2-heptadecyl - 4 - methyl-2-oxazoline, 2,4,4-trimethyl-2-oxazoline, 2,4,5-trimethyl-2-oxazoline, 2,4-diethyl-4-phenyl - 2 - oxazoline, and the like.

The fatty acid anhydrides which may be utilized are any of the aliphatic anhydrides particularly acetic, propionic, butyric, isobutyric, valeric, caproic, caprylic, capric, lauric, myristic, palmitic, and stearic.

The following specific example is illustrative of my process:

Example

Tris(acetoxymethyl) acetamidomethane is prepared from acetic anhydride and 2-methyl-4,4-bis(acetoxymethyl)-2-oxazoline by the following procedure:

One part of 2-methyl-4,4-bis(acetoxymethyl)-2-oxazoline was refluxed with two parts of acetic anhydride for 15 minutes. Two volumes of saturated salt solution were then added and the mixture shaken, whereupon crystals of tris(acetoxymethyl) acetamidomethane separate out and were recrystallized from water. This material was identified by means of its melting point which is 113–115° C., and by its mixed melting point with an authentic sample.

The O-acylated amides prepared in accordance with the process of my invention are either liquids or solids, depending upon their compositions, and are useful in the preparation of surface active compositions, and as solvents or plasticizers for various film-forming materials.

Although the above description points out the specific embodiments of my invention, it is to be understood that departures may be made therefrom within the scope of the invention as described and claimed.

What is claimed is:

1. A method for the production of O-acylated amides which comprises reacting a fatty acid anhydride with an oxazoline of the following formula:

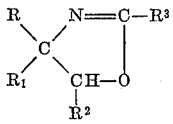

where R is selected from the group consisting of hydrogen, phenyl, alkyl, and acyloxyalkyl; $R^1$ is selected from the group consisting of alkyl and acyloxyalkyl; $R^2$ is hydrogen; and $R^3$ is alkyl, and then treating the resultant mixture with water.

2. A method for breaking the ring structure of 2-alkyl substituted oxazoline by acylation which comprises reacting a fatty acid anhydride with a 2-alkyl substituted oxazoline compound at refluxing temperature, adding water thereto and separating the acylated aliphatic hydroxy amide thus produced.

3. A method for preparing an O-acylated amide having the following formula:

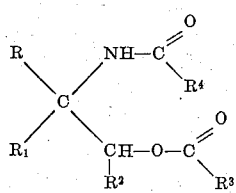

where R is selected from the group consisting of hydrogen, phenyl, alkyl, and acyloxyalkyl; $R^1$ is selected from the group consisting of alkyl and acyloxyalkyl; $R^2$ is hydrogen; $R^3$ is alkyl; and $R^4$ is alkyl, which comprises reacting a 2-oxazoline with a fatty acid anhydride at refluxing temperature, treating the resultant mixture with water, and separating the reaction product.

4. A method for preparing tris(acetoxymethyl)-acetamidomethane which comprises reacting acetic anhydride with 2-methyl-4,4-bis(acetoxymethyl)-2-oxazoline at refluxing temperatures, treating the resultant mixture with water and separating the crystalline tris(acetoxymethyl)-acetamido methane.

5. A method for the production of O-acylated amides having the following formula:

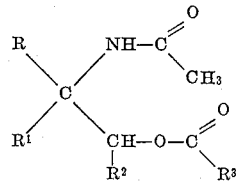

where R is selected from the group consisting of hydrogen, phenyl, alkyl, and acyloxyalkyl; $R^1$ is selected from the group consisting of alkyl and acyloxyalkyl; $R^2$ is hydrogen; and $R^3$ is alkyl, which comprises reacting with acetic anhydride at reflux temperature a 2-oxazoline of the following formula:

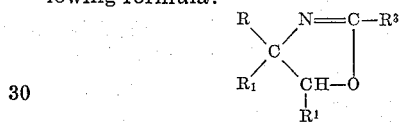

where R, $R^1$, $R^2$, and $R^3$ are as described above. having the following structural formula:

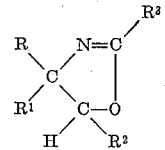

wherein R, $R^1$, $R^2$, and $R^3$ are as described above, treating the resultant mixture with water, and separating the reaction product.

PHILIP F. TRYON.